May 9, 1967  R. E. LANGLOIS  3,318,746
METHOD FOR BONDING BODIES OF MULTI-FILAMENT STRANDS
Filed Oct. 18, 1962  3 Sheets-Sheet 1

INVENTOR
ROLAND E. LANGLOIS
BY
ATTORNEYS

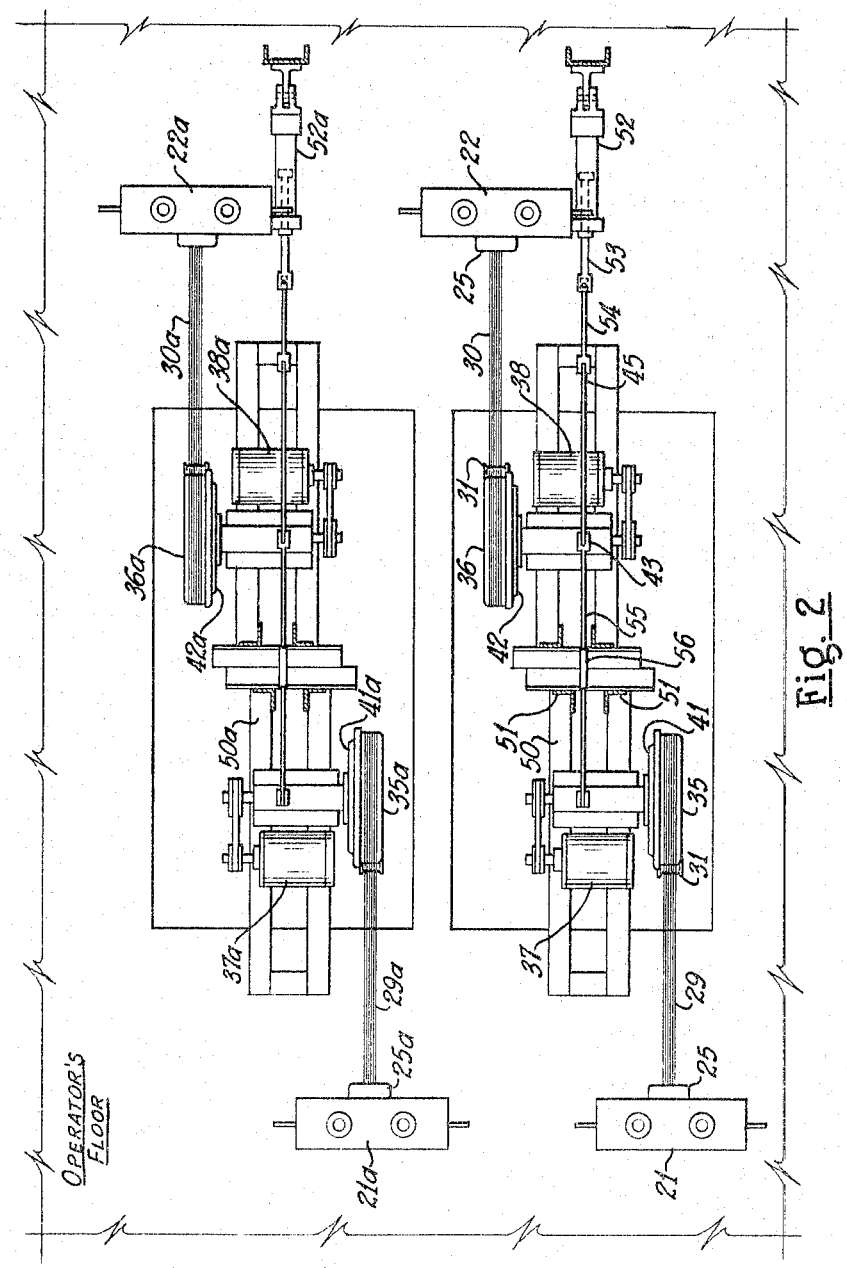

May 9, 1967 R. E. LANGLOIS 3,318,746
METHOD FOR BONDING BODIES OF MULTI-FILAMENT STRANDS
Filed Oct. 18, 1962 3 Sheets-Sheet 3
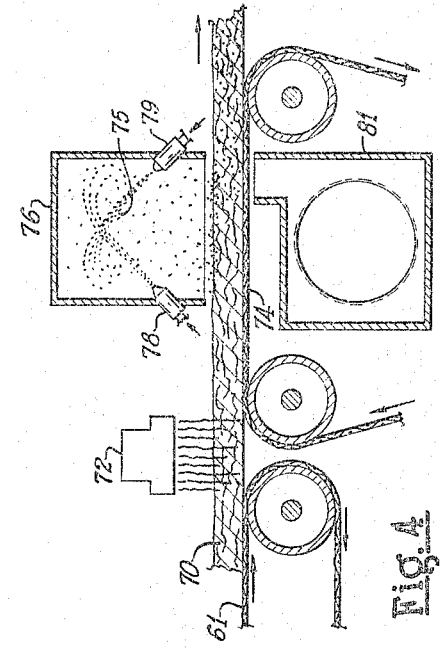
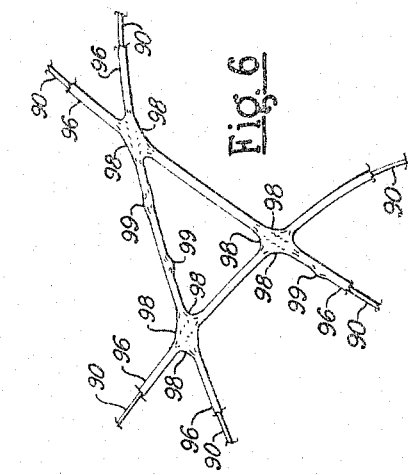
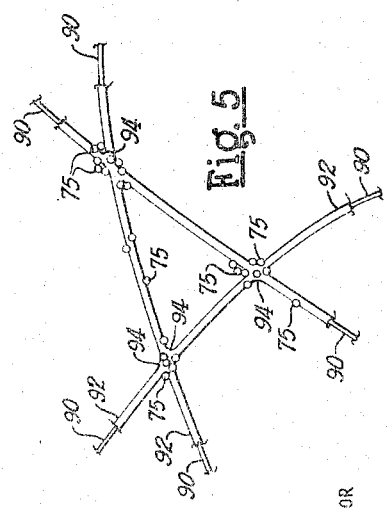
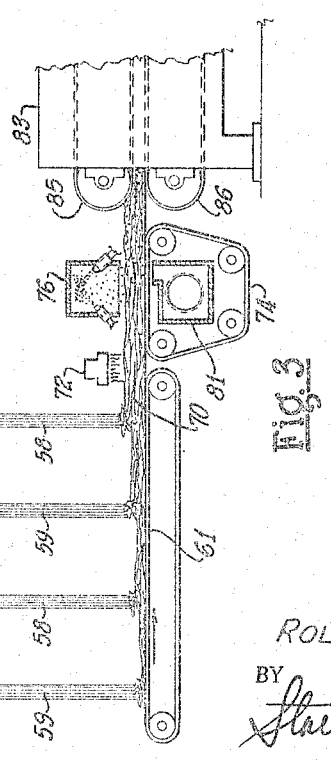
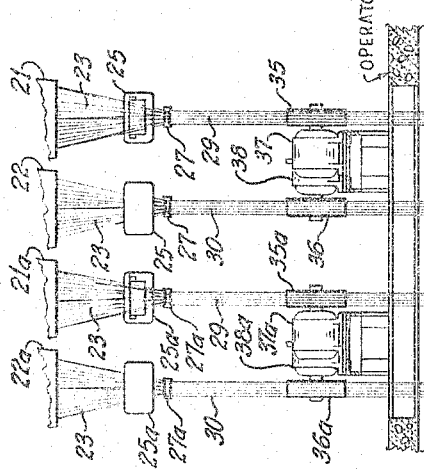
INVENTOR
ROLAND E. LANGLOIS
BY
ATTORNEYS United States Patent Office 3,318,746
Patented May 9, 1967

3,318,746
METHOD FOR BONDING BODIES OF
MULTI-FILAMENT STRANDS
Roland E. Langlois, Newark, Ohio, assignor to Owens-Corning Fiberglas Corporation, a corporation of Delaware
Filed Oct. 18, 1962, Ser. No. 231,431
11 Claims. (Cl. 156—167)

This invention relates to methods of applying binders to fibrous products and more particularly to methods of distributing and combining binders in such products.

More specifically the invention relates to a process for bonding multi-filament strands in a body of desired form, in which the filaments are of fibrous glass and are gathered into strands immediately subsequent to the filament forming operation, and the strands are then collected and arranged in a body.

Mats of fibrous glass, because of the inherent glass properties, especially those of strength and inertness, have many uses. They have been employed as filtering, acoustical and thermal insulating media. They also serve effectively for roofing sheets, non-woven fabrics, and for reinforcing plastic products.

In some instances the mats are composed of short fibers held together by a binder. In others the mats are bonded webs of chopped fibrous glass strands. Bundles or strands of continuous glass filaments have also been disposed in mat form. Strands of filaments have superior strength because of the continuous nature of the filaments and their concentrated linear association in strand form. Accordingly, fibrous glass strands are a most desirable constituent where strength is a prime consideration.

Various resinous materials including dispersions, emulsions, solutions, and dry granular powders have been applied to fibrous glass masses as bonding material to give the finished products dimensional stability and strength. Such liquid or powdered resins have been added in various ways such as by wiping, spraying, submersion and dusting. Obtaining effective and uniform distribution of binding material at a reasonable cost has always posed a problem which has not been too successfully met by previous procedures.

A most common method employed has been to spray a water dispersion or suspension of the resinous material upon the fibrous glass immediately adjacent the fiber forming operation. This method provides a mat or other body, in which the fibers are massed, having fairly uniform binder distribution and good strength. However, an excessive amount of water is involved and it is subsequently necessary to drive off through heating a major part of this water. This heating requires considerable time and is otherwise costly from a production standpoint.

The same problem of a heavy water content is faced when a liquid binder is applied by spraying or by dipping to a mat of chopped strands or continuous strands.

Another former method has been to submit the mat of fibers to a scattering of a powdered resinous material. This granular binder has been necessarily shakened down into the mat by vibration and later set by application of heat. In some instances it is necessary to tear the mat apart to admix the resin particles. The mats so treated tend to have poorly bonded areas reducing tensile strength, and high ignition losses, indicating respectively non-uniform distribution and an excessive binder component.

A broad object of this invention is to provide a method of producing mats having excellent integrity and strength.

Another principal object is to provide a method by which uniform distribution of binder materials is secured in fibrous mats and other products.

An additional important object is to provide a method of utilizing binder so effectively that a minimum quantity is required.

More specifically it is an object of this invention to provide a process of applying binder which involves the primary application of a binder in liquid form and a secondary application of binder in a powdered state.

Another object is a particularly unique method in which drying of the liquid content of a mass of fibers is accomplished in a gradient manner and a powdered binder is applied thereafter.

More particularly an object of this invention is to provide a process for drawing continuous filaments of glass, applying a primary binder to the filaments, gathering the filaments into a plurality of strands, collecting the strands in a body of desired shape and curing the binder, the binder being of a nature and of sufficient quantity to not only integrate the individual strands but to also bond the strands together in the body.

A further object of the invention is a process for bonding multi-filament strands in which a binder in limited quantity is first applied longitudinally to the individual filaments and a second powdered binder also in limited quantity is subsequently applied in dispersed form to the strands in which the filaments have been gathered.

These and other objects and advantages of the invention are secured by the provision of a process for bonding together multi-filament strands in which a liquid binder is first applied to the individual filaments, the filaments are then gathered into strands, the strands are collected in a body of desired configuration, the liquid binder in the body is dried in a graduated manner whereby the binder adjacent one surface is compartively dry and the opposite surface is comparatively wet, a powdered binder is directed against the said compartively dry surface and toward the comparatively wet surface, the powdered binder being distributed and retained uniformly through the body due to the increasing proportion of the binder being caught by the progressively wetter portions while the amount of the binder decreases through the progressive retention of the binder particles as they pass through the drier portions of the body.

Where the fibrous mat or other fibrous body is intended for a reinforcing component of plastic material shaped by matched die molding the liquid binder after drying may, for example, comprise between one and one and one half percent by weight of the fibrous body. This is in a low content binder range desirable to minimize the total binder when the liquid binder is combined with a powdered binder later distributed through the body or mat in which the strands are collected.

As applied by a belt applicator the liquid binder can be wiped on the descending strand-forming filaments in an even and metered manner. Good results have been attained with a liquid binder having about five percent by weight of a resin or other basic bonding ingredient dispersed in a water vehicle, the latter comprising practically all of the other ninety-five percent of the composition with allowance for a comparatively small quantity of coupling and lubricating ingredients.

Ather coating means may be employed for applying the binder to the filaments. Some alternate methods involve spray devices, dipping reservoirs, and stationary felt applicators.

It is, however, important that the binder coating or film be uniform, continuous, and not excessive in quantity. The various lubricating, coupling and bonding functions of the binder are thus uniformly effective throughout the lengths of the continuous filaments and the strands in which they are combined. A belt applicator is considered most practical for securing the desired continuous and uniform characteristics in the binder coating.

In the event that the bonding together of the body strands is dependent alone on the liquid binder coating on the strands, the proportion of the solid resin component left on the strands should advisably be increased to about three percent by weight of the strand assembly even for binder material of the highest effectiveness. For other less active materials the proportion may be five or more percent.

Should the body of strands be combined, shortly after forming, with a resin matrix with which it is to be laminated, the physical inter-engagement of the strands, possibly assisted by the cohering property of a slight amount of a coupling size may be relied upon to temporarily hold the body in shape.

The resinous powder dispersed or suspended in the liquid binder is preferably a polyester but may be other thermosetting resins such as melamines, acrylics and epoxies, capable of being maintained in a stable suspension in a liquid vehicle, the latter preferably being water from both an economical standpoint and ease of processing.

The powdered binder when applied dry to the mat or other body of strands, in combination with the previously applied liquid binder, preferably amounts by weight to between one and a half to two percent of the finished mat or body. When utilized alone for bonding the mat the powdered binder should constitute three to ten percent of the final product.

In the past the composition applied to continuous filaments prior to or at the time of their being gathered into a strand has been termed a "size." Common fibrous glass textile sizes are named after their principal ingredient, among which are starch, gelatin, silane, chrome and silane-chrome. The primary purpose of this coating has been to lubricate the filaments so that they do not break in the gathering operation. Other important functions have been to tone or limber the filaments, to integrate the filaments in strand form, and to make the filament surfaces receptive to subsequent processing including the application of a binder and joining the filaments with resins in laminates.

A "size" applied to continuous filaments has never before served as an adhering agent to hold strands together in the body in which they may be finally assembled. When collected in temporary package form, as on a bobbin, a strand must not adhere to adjacent turns but be free to be easily withdrawn therefrom for processing.

The amount of the conventional size applied to filaments has usually amounted in dried form to less than three percent by weight of the finished product and in rare instances to as much as five percent. After the strand is plied, twisted and woven into conventional fabrics the size may be removed by washing or burning prior to dyeing of the fabric. In the processes of the present invention the composition applied to the filaments is of a permanent nature, the presence of which is retained in the final product.

The term "binder" in conventional use has had reference to a material introduced into a mass of fibrous glass, after the mass has been formed, to integrate the mass. In the principal methods of the present invention the "size" or composition applied to the continuous filaments, in addition to its "size" functions, is uniquely utilized to contribute to or be entirely responsible for the bonding together of the filament strands in the mat or other body in which the strands are collected. Accordingly this "size" functions in the manner of a composition generally considered previously as a "binder."

For purposes of this application it is not intended to assign exact definitions to the terms "size" and "binder" but to rely more on the properties specifically stated for the compositions involved. However, where "binder" is recited it should be taken as a material possessing bonding properties, not only to hold filaments of a strand together, but also, when present in sufficient quantity and of the proper character, capable of bonding associated strands into an integrated body.

The binder in powder form may be the same resin as that of the liquid binder or one compatible therewith. Polyesters, phenolics, acetates and acrylics are among those which have proved satisfactory.

The gauge of the dry resinous particles may be between forty and two hundred mesh while eighty mesh size is preferred. The latter indicates a diameter of six hundred and ninety hundred thousandths of an inch, which approximates the diameter of a strand composed of sixty filaments of nominal diameter of fifty, hundred thousandths of an inch.

As the strands are deposited in mat formation they carry a liquid binder generally between twenty six and thirty one percent by weight. The liquid binder tends to gather at contact points between overlying strands, apparently due to the still fluid nature of the binder and the surface tension of the water vehicle.

It is indicated that such concentrations of the liquid binder take the shape of minute webs with edges curved by surface tension on the order of a meniscus. The ends of each web terminate on the two different strands which are in crossing contact behind the web.

A main feature of this invention involves the development of a graduated moisture content down through the mat or other body of the strands prior to the scattering thereover and therethrough of a powdered binder. This moisture may be derived from a primary binder, a water size, or from water alone, the latter not being considered usually suitable.

The method considered best for creating this progressively wetter condition from the top surface downwardly involves directing infra red heat against the upper side of the mat. The timing and intensity of this heat and positioning of its source, are set according to the porosity and thickness of the mat to effect the desired decreasing scale of drying down through the body.

Evidently, the minute, water-ladened webs of the primary liquid binder in the top surface stratum of the mat are majorly reduced by the evaporation of the water vehicle due to the direct heat received, while those in the bottom stratum remain virtually intact. The reduction of the webs intermediate the surface areas is progressively less in a downward direction. Accordingly, the top of the mat may be termed substantially dry while the bottom portion retains its original moisture.

Consequently, when the dry powdered resin, scattered over the mat, drops therethrough by gravity there is little moisture left in the webs of the upper part of the mat to catch and hold the particles of binder. However, because of the original quantity of the particles a fair share of them do lodge in the top portion of the mat. As the balance of the particles proceed through the mat a larger proportion of the ever reduced quantity are caught.

Through this balancing of the decreasing quantity of the binder particles and the increasing holding power of the larger webs the particles are uniformly distributed through the pack, with few particles passing completely through. The porous nature of a mat of continuous strands is an important factor in the surprising success of this method.

In the drawings, FIGURE 1 is a front elevation of apparatus with which our invention may be practiced;

FIGURE 2 is an enlarged plan view of the apparatus of FIGURE 1, with an additional pair of pull wheels and associated equipment;

FIGURE 3 is a somewhat diagrammatic side elevation of a portion of a production line incorporating the apparatus of FIGURES 1 and 2;

FIGURE 4 is an enlarged side elevational view of the drying heater and a powder applicator included in the production line of FIGURE 3;

FIGURE 5 is a greatly enlarged showing of several strands of a mat, the strands having a coating of a primary liquid binder with particles of a dry secondary binder on the strands located predominantly at the intersections of the strands; and FIGURE 6 depicts the strand portions of FIGURE 5 and the fused condition of the binders thereon following the heat curing of the binders.

Figure 1:
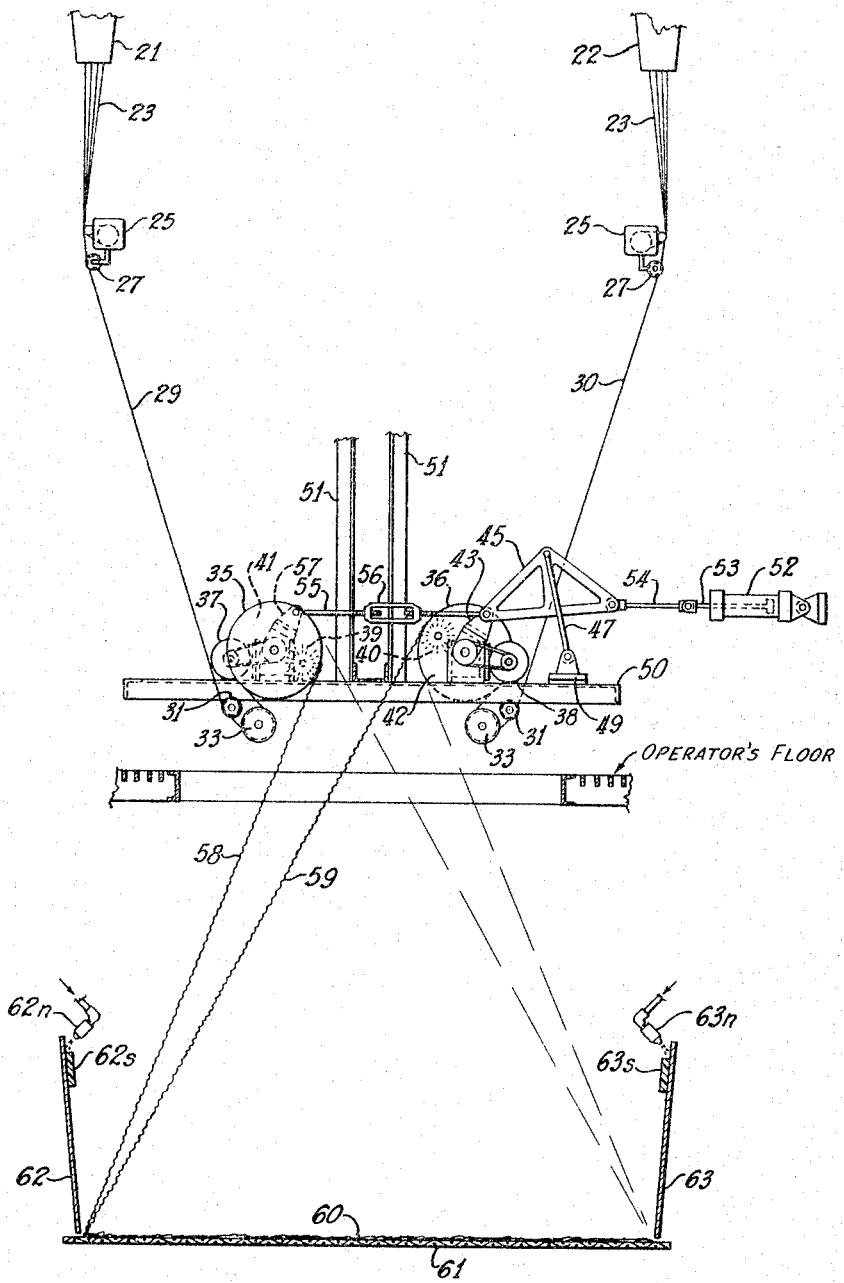

Referring to the drawings in more detail the apparatus of FIGURES 1, 2 and 3 includes molten glass feeding bushings 21 and 22 depending from conventional glass melting tanks which are not illustrated. A second paired set of bushings 21a and 22a is depicted in FIGURES 2 and 3. The additional equipment of FIGURES 2 and 3 duplicates that of FIGURE 1 and will not be described separately. The main components carry the same identifying numbers as the like parts of the apparatus of FIGURE 1 but with the letter "a" following each number Continuous filaments 23 are drawn from the minute streams of molten glass issuing from orifices of the bushings. It will be considered that a bushing with 352 orifices is here utilized and the filaments are drawn to an average diameter of fifty, hundred thousandths of an inch.

Size or binder is applied to the filaments as the latter pass over the travelings belts or aprons on the conventional size applicators 25. The size may merely be water to reduce friction between filaments as they are subsequently joined together in strand form and to supply moisture for cooperation in the distribution of dry binder particles, later added. A more complex size or binder is however desired to promote coherence of the filaments when combined as strands, and adherence of the strands of filaments to the surfaces of the pulling wheels. Where the mat produced is to be ultimately combined with a plastic resin, it is also desirable to include a coupling agent in the size which facilitates wetting of the mat by the resin.

Since the primary size or binder is applied as a continuous coating on the fibers and therethrough on the strands, and the secondary binder in particulate form is scattered through the mat in comparatively widely spaced relation, the coupling agent in the continuous coating is readily contacted by the resin, with which the mat may be later laminated. This is an important feature of the method combining a primary liquid size or binder with a later applied powder binder.

A preferred form of primary binder is one retaining sufficient cohesive properties when cured to contribute to or, for some purposes, to completely bond the strands in the mat or other form in which they are collected on the conveyor or the receiving surface. Such a binder has the dual purpose of holding the filaments together as strands, and of bonding the strands into an integrated body.

As the mats are produced immediately below the glass filament forming stations, a commonly used lubricant component of the size may be omitted. The inclusion of such a lubricating material has been found necessary for improving the handleability of the strands where the strands go through subsequent operations such as plying and twisting, but it is not otherwise necessary, and in fact interferes with effective wetting of the strands by a plastic resin.

The filaments from each bushing, after sizing, are grouped together to form a set of six strands individually segregated as they travel within six grooves over the respective gathering shoe 27. Each strand contains about sixty filaments. The division of the filaments into strands is here accomplished manually at the start of operations.

The sets of stands 29 and 30 pass under the aligning shoes 31 which are grooved in the same manner as the gathering shoes 27.

To help keep the pull wheels clean of size and to distribute the wearing action of the strands on the pull wheel the aligning shoes may be given a slight traversing action. This slowly shifts the strand position on the pulling wheel, moving back and forth about once in three minutes.

From shoes 31 the two sets of spaced strands 29 and 30 are led around the two idler wheels 33 and respectively travel around the pull wheels 35 and 36. These wheels are similarly constructed but are relatively reversed in position.

When the primary size or binder is applied to the filaments in a quantity that creates a substantial coating on the strands, making them unhandleable in prior systems, they are here processed without difficulty due to the fact that the strands are contacted by the pulling mechanism briefly on one side only, and if necessary supplementally by continuously washing the pull wheel surfaces with a water spray.

Motors 37 and 38 respectively drive pull wheels 35 and 36. The strands carried by pull wheel 35 are released therefrom by the successive projection of fingers of oscillating spoke wheel 39 through slots in the peripheral surface of the pull wheel 35, while the fingers of spoke wheel 40 serve this purpose in connection with pull wheel 36. The strands are kinetically projected in tangential paths from the pull wheels.

The rear side of each pull wheel is covered by an independently mounted, oscillatable back plate on which the associated spoke wheel is carried. Back plate 42 of the assembly including pull wheel 36 is arcuately oscillated through arm 43. The latter is driven by functioning of the fluid cylinder 52 which sets through the triangular link 45, which pivots upon bar 47 on the base 49. The piston rod 53 extending from the cylinder is joined to the triangular link 45 by linking rod 54. The base 49 is positioned on the platform 50 which also supports the pull wheels 35 and 36 and the equipment associated therewith. Platform 50 is suspended by angle iron hangers 51.

Through the connecting assembly 55, including the turnbuckle 56, the transverse movement of the triangular link 45 is transmitted to arm 57 to arcuately oscillate the spoke wheel 39 within the pull wheel 35. This oscillation is preferably in an arc of approximately fifty-seven degrees. With the single means effecting the oscillation of both spoke wheels their action may be closely synchronized.

The group of strands 58 thrown down by the pull wheel 35 and the group of strands 59 thrown down by the pull wheel 36, and the strands from any other pull wheels preceding this pair are accumulated in mat from 60 upon traveling conveyor 61, which is preferably of carbon steel chain construction. Side shields 62 and 63 define the edges of the mat 60 and prevent undesirable lateral overreaching of the strands. A two foot height for these shields is generally sufficient.

To prevent adherence of the strands to the side shields 62 and 63, strips 62s and 63s of open-cell foam or of other porous material, about one half inch thick are attached along the shields near the top edges thereof. Plain cotton rag material has been found to be satisfactory. Water nozzles 62n and 63n are arranged to feed water to the upper surface of the foam strips. The water seeps through the strips and is distributed uniformly to form a water film flowing down the surfaces of the shields. Tubing with a series of holes may be used instead of the nozzles 62n and 63n to deliver the water and may be employed for directly forming the water films.

The width of the conveyor covered by the mat in this case is four and one half feet, but this may be varied through a wide range by changing the oscillating arc length of the spoke wheels and the distance of the pull wheels above the conveyor. The side shields 62 and 63 are mounted to adjust their spacing to match the width of the deposited material. Ordinarily the width utilized would be between extreme limits of two and nine feet.

With the high peripheral speed of the pull wheel, the strands are forcefully projected in straight tangential lines from the oscillating point of disengagement effected by the fingers of the spoke wheel. The kinetic energy the strands thus acquire carries them in straight courses to the region of the conveyor surface. Here they are self-positioning in lazy whirl formation with each strand assuming an individualistic pattern but disposed in inter-engaging and interleaving relation with the other five strands of the set.

The group of strands is thus deposited in a reciprocating strip disposed in a constant repeating pattern and with substantially stable dimensions.

Consequently, full control may be exercised to obtain a desired relationship between adjacent courses of the strip deposited from a single wheel and to complement or match the resulting pattern with that developed by the deposit of strips from associated pull wheels. The mat produced may thus be assured of having a thickness with a high degree of uniformity, or a definite repeated pattern of varying thicknesses, if such is required.

Strands of filamentized strands as well as the generally preferred integrated strands can be included in the product by having one or more of the wheels provided with a deflecting surface in the path of the projected strands.

As shown in FIGURES 3 and 4 the composite mat 70 formed on the conveyor 61 by the successive deposits of projected groups of strands, moves under the infra red heater 72 to the intermediate conveyor 74.

The infra red rays developed by heater 72 have the greatest energy in wave lengths below thirty microns and accordingly penetrate and are not inclined to be reflected by most substances including clear glass. The heater 72 may include a ceramic honeycomb heated by a gas flame, or have bulbs or nickle chrome rods electrically energized. The infra red rays emitted by such elements are apparently absorbed by the fibrous glass strands with little transmission or reflection of the rays by the strands. In fact certain frequency bands of these rays are entirely absorbed by glass.

For this reason the overall power of the rays diminishes down through the mat and the heat generating effect is progressively reduced. Accordingly, moisture removal is greatest in the upper portion of the mat and is least at the bottom.

A descending cloud of dry binder particles 75 is produced in the chamber 76 above conveyor 74 by spray devices 78 and 79 or by other diffusing means. The particles gravitate downwardly into the horizontally traveling mat.

When the particles strike a strand in the mat they may bounce away or be held by the moisture of the primary water, size or binder. Such attachment most usually occurs when the particle hits adjacent to a point of crossover between overlying strands. The particle may be structurally caught between closely angled adjacent strands, held by the residual liquid in webs at such points, by liquid still present along a single strand, or be hung by surface moisture between closely positioned strands. The few particles not caught by the mat pass through the mesh openings of conveyor 74 into exhaust compartment 81.

With the powdered binder distributed uniformly therethrough the mat 70 enters the binder curing oven 83 between upper and lower conveyor flights 85 and 87.

In FIGURE 5 the strands 90 are shown covered with the primary liquid sizing or binder 92 derived from the coating given the individual filaments 23 by the applicator 25. The minute webs which this liquid material is inclined to form when concentrated in the contact areas between two crossing strands are indicated at 94. These webs are greatly reduced in size and the moisture along the strands minimized in the upper strata of the mat due to the drying effect of the infra red heater 72.

Since the particles 75 of dry binder, dropping down through the mat 70 from the diffusing chamber 76 and striking against the strands, are more apt to remain at those spots and areas where there is greater moisture, the particles will likely lodge in the minute webs 94 of the primary coating 92 as illustrated, and of course are caught more easily in the larger of such webs deeper in the mat as the quantity of the binder particles becomes more sparse.

The fragmented strands 90 of FIGURE 5 are shown again in FIGURE 6 after the resin binder component of the primary coating 92 and the particles of dry binder 75 have been fused and cured by oven 83. At the crossing points of the strands solid webs 98 are formed and along the strands may be occasional enlargements 99 of cured binder resulting from the prior presence of particles of dry binder.

The bonding effect of the two binders is uniform and strong throughout the body of strands and is obtained with a very economical quantity of binder, and with a comparatively short drying and curing time due to the low moisture content compared with that generally required in other bonding processes.

While this preferred method of the invention prescribes the application of a primary binder dispersed in a liquid vehicle and the subsequent dispersement of dry powdered binder through the body formed by the strands, with both binders contributing to the bonding of the strands of the body, the invention also encompasses the utility of a primary binder of a character and in a quantity sufficient to act alone, without the dry binder, to bond the filaments into strands and to be exuded to the surface of the strands to subsequently bond the strands and integrate the body in which they are assembled.

Another alternate procedure of the invention is the use of water alone or of a simple size with a water vehicle as a primary coating on the filaments in sufficient quantity to provide a moisture coating on the strands resulting from the gathering of the filaments. Water alone is usually undesirable as in most circumstances it is necessary to coat the filaments with some conventional residual substances, originally carried by the water or other vehicle, having properties such as cohesion, lubricity, adhesion, resin coupling or compatability, chemical resistance and finish.

The surface moisture on the strands derived from such aqueous coating material is the attaching factor, after infra red gradient drying, for the distributed retention through the mat, or other body, of the particles of dry bonding material.

While both alternate methods of the invention are entirely feasible and in fact occasionally preferable for strand bodies where integrated strength is not necessary, under most conditions they would require a greater quantity of the resinous binder component to effect bonding strength, comparative to that obtained through the principal method, and at the same time are not capable of providing sufficient integrity and strength for the severe requirements of some end uses of the mat products.

Various substitutions and variations in the methods specifically set forth herein will suggest themselves to persons skilled in the art. Such obvious changes are considered to come within the spirit of the invention and the scope of the accompanying claims.

I claim:
1. The method of producing an integrated body of fibrous strands which comprises forming continuous filaments, applying a liquid dispersed binder as a continuous, uniform coating on the filaments, gathering the filaments into strands, collecting the strands in a body of substantial thickness, applying heat down through the body in a gradually decreasing intensity to volatilize the liquid in a correspondingly gradually decreasing degree until the uppermost portion of the body is substantially dry, directing a quantity of dispersed particles of a dry binder down through the body, said particles having an affinity for retention by the liquid, whereby, as the number of particles decrease through lodging on and retention by the liquid of the strands, a greater proportion are retained by the ever increasing liquid content down through the body, and finally curing the liquid dispersed binder and the dry binder particles to integrate the body.

2. A method according to claim 1 in which the liquid dispersed binder and the particles of dry binder are both of a resinous nature.

3. A method according to claim 1 in which the heat is applied down through the body by directing infra red rays downwardly into the body.

4. A method according to claim 1 in which the diameter of the particles of dry binder is approximately the same as that of the individual strands.

5. The method of uniformly bonding a body of fibrous strands comprising forming a comparatively thick, porous body of fibrous strands with a liquid element on the strands, said liquid element being in sufficient quantity and of a character promoting lodgement and retention of dry binder particles brought into contact with the liquid element, varying in a graduated manner the amount of liquid on the strands so that the least amount of liquid is on the strands at the top of the body and the greatest amount of liquid is on the strands at the bottom of the body, dispersing a predetermined quantity of particles of dry binder down through the body for retention by the liquid, and finally curing the binder particles.

6. A method according to claim 5 in which the liquid is vaporizable by heat and the varying in a graduated manner the amount of liquid is accomplished by directing infra red rays down into the body.

7. A method of bonding a body of fibrous strands which comprises forming continuous filaments, applying a heat settable binder material as a uniform, continuous coating upon the filaments, combining the filaments into strands, collecting the strands in a body, the binder material applied to the filaments being of such a character and present in such a quantity upon the exterior of the strands to attach the strands together and so integrate the body when the binder material is set by heat, and finally applying heat to the body to set the binder material.

8. A method of bonding a body of fibrous strands which comprises forming continuous filaments, applying a settable binder material as a uniform, continuous coating upon the filaments, combining the filaments into strands, collecting the strands in a body, the binder material applied to the filaments being in such a quantity as to be present upon the exterior of the strands and of a character to attach the strands together and so integrate the body when the binder material is set and finally setting the binder material.

9. A method according to claim 8 in which dry binder particles are dispersed through the body prior to the seting of the binder material.

10. A method according to claim 7 including the additional step of combining with the binder material a component having an affinity for coupling with a resinous material with which the body of fibrous strands may be subsequently impregnated.

11. The method of bonding a porous body of fibrous strands which comprises forming continuous filaments, applying a volatile liquid element along the length of the individual filaments, combining the liquid coated filaments into strands, collecting the strands in a porous body, the liquid element on the filaments of the collected strands being in sufficient quantity and being of a character to retain on the strands dry binder particles brought into contact therewith, directing through the porous body a dispersed predetermined quantity of dry binder particles of a composition curable by heat, and then heating the body to volatilize the liquid element and to cure the binder particles retained in spaced relation on the strands by the liquid element whereby said strands are interbonded by the binder particles.

References Cited by the Examiner

UNITED STATES PATENTS

| | | | |
|---|---|---|---|
| 2,230,271 | 2/1941 | Simpson | 156—167 X |
| 2,478,939 | 8/1949 | Pape | 156—284 X |
| 2,489,985 | 11/1949 | Speight | 156—283 X |
| 2,574,221 | 11/1951 | Modigliani | 156—167 |
| 2,692,219 | 10/1954 | Slayter et al. | 154—44.15 |
| 2,699,415 | 1/1955 | Nachtman | 156—167 |
| 2,715,086 | 8/1955 | Frederick | 156—166 X |
| 2,729,582 | 1/1956 | Modigliani | 156—167 |
| 2,798,020 | 7/1957 | Balz et al. | 156—167 |
| 2,827,727 | 3/1958 | Lipsius | 117—33 |
| 3,056,708 | 10/1962 | Ball | 154—44.15 |

ALEXANDER WYMAN, *Primary Examiner.*

MORRIS SUSSMAN, *Examiner.*

EARL M. BERGERT, *Assistant Examiner.*